United States Patent Office 3,092,460
Patented June 4, 1963

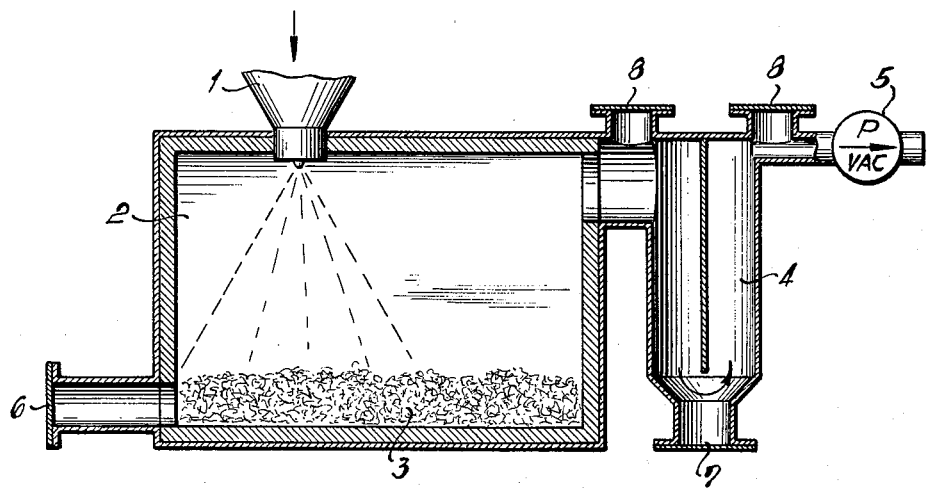

3,092,460
PROCESS FOR DECREASING THE OXIDE CONTENT OF COMMERCIAL CALCIUM CARBIDE
Heinrich Röck, Trostberg, Upper Bavaria, Germany, assignor to Suddeutsche Kalkstickstoff-Werke A.G., Trostberg, Germany
Filed Apr. 13, 1961, Ser. No. 102,850
Claims priority, application Germany Apr. 22, 1960
2 Claims. (Cl. 23—208)

The invention relates to the manufacture of calcium cyanamide.

When commercial calcium carbide shall be converted to calcium cyanamide, it is important to maintain the $CaC_2$ content of the carbide as high as possible and to keep the content of $SiO_2$ and other harmful oxides as low as possible in order to produce high yields in the nitrogenation. Also in the preparation of metallic calcium by thermal dissociation of calcium carbide, it is of advantage to use a high percent carbide in order to avoid harmful side reactions. In final analysis, it is desired to use a calcium carbide which contains few oxidic impurities (essentially CaO and $SiO_2$, but also minor amounts of other oxides).

Commercial carbide contains between 75 and 85 percent of $CaC_2$. The main impurity is CaO, which lowers the melting point (2300° C.) of pure $CaC_2$. An eutectic exists at about 75% $CaC_2$ and 1640° C. Due to the melting point depression, commercial carbide can be tapped from 1700 to 1800° C. It would not be practical to produce in the electric furnace carbide containing more than 90 percent $CaC_2$ because this would require very high furnace and tapping temperatures.

The reactions connected with the formation of carbide from calcium oxide and carbon in the electric arc furnace have been thoroughly investigated. It has been recognized that the desired reaction (formation of calcium carbide)

(1) $\quad CaO + 3C \rightarrow CaC_2 + CO$ is suppressed in vacuo because there CaO and C react preferably according to reaction (2) $\quad CaO + C \rightarrow Ca + CO$ A side reaction in the carbide manufacture is (3) $\quad 2CaO + CaC_2 \rightarrow 3Ca + 2CO$ where calcium carbide already formed reacts with residual CaO. Said reaction takes place particularly in vacuo.

According to the invention, Reaction 3 is utilized to reduce the oxide content of the carbide by subjecting the molten carbide outside of the melting furnace at a temperature of 1600 to 2000° C. to a vacuum of about 1 to 100 mm. Hg. In a preferred embodiment of the invention, the molten carbide is sprayed, immediately after tapping, into an evacuated space. The atomized liquid particles of the carbide melt react readily according to Equation 3 at a temperature of 1600 to 1700° C. when a pressure below 10 mm. Hg is maintained.

The $SiO_2$ impurities of the carbide react under the recited conditions according to equation (4) $\quad 2SiO_2 + 3CaC_2 \rightarrow 2SiC + 4CO + 3Ca$ SiC is difficulty volatilized and remains in the carbide where it does not affect either the nitrogenation or the thermal dissociation of the carbide.

Similarly, the aluminum oxide contained in normal commercial carbide reacts according to the equation (5) $\quad 4Al_2O_3 + 9CaC_2 \rightarrow 2Al_4C_3 + 9Ca + 12CO$ The liquid particles solidify, on the one hand, as a result of the cooling effect of the reaction, on the other hand due to the increase of the solidification point during the course of the reaction. The vacuum of 10 mm. Hg is readily obtained by means of a water jet suction pump. As the developed gaseous CO and Ca condense in the colder parts of the gas exhaust with partial reconversion to $CaC_2$ and CaO, it is not necessary to draw off all the CO. Due to the gas evolution the obtained tear-shaped carbide is of porous structure and, therefore, particularly reactive.

The $CaO/CaC_2$ mixture collected in the dust separator is briquetted and returned into the carbide manufacture. The vacuum and the temperature of the carbide particles must be maintained in a certain relationship to prevent thermal dissociation according to equation (6) $\quad CaC_2 \rightarrow Ca + 2C$ For instance, the vacuum should be at a temperature of 1900° C. between 120 and 20 mm. Hg
1800° C. between 60 and 10 mm. Hg
1700° C. between 20 and 5 mm. Hg
1600° C. between 7 and 1 mm. Hg Within said limits, the reaction is self-regulating because Reaction 3 takes place always first because of the high partial pressures of the Ca+CO, whereby the particles are cooled so far that at the obtaining vacuum Reaction 6 is possible only to a minor extent.

Apparatus suitable for carrying out the reaction is, by way of example, diagrammatically shown in the accompanying drawing.

Conventional commercial carbide flows directly from the taphole through a graphite nozzle 1 into the vacuum chamber 2, which is lined with carbon stones. The liquid carbide is sprayed; it reacts, as set forth hereinabove, and collects in form of a loose aggregate at the bottom 3 of the chamber. It contains more than 90% $CaC_2$. The gases and vapors are sucked off by the vacuum pump 5 through a dust separator 4. The openings 6 and 7 can be closed and serve for the removal of the high grade carbide and of the $CaO/CaC_2$ mixture collected in the dust separator 4. The opening 8 is provided for cleaning.

The following example is given to illustrate the method of the invention when carried out in the apparatus shown.

*Example*

From a carbide oven, part of the normal tapping in an amount of 355 kg. was sucked into the evacuated chamber 2. The nozzle 1 and chamber 2 had been preheated to prevent premature solidification of the liquid carbide.

A ladle test of the carbide spray gave the following composition: 80.9% $CaC_2$; 12.3% CaO; 0.6% $SiO_2$. The optically measured temperature of the tapped carbide was 1970° C. At the beginning of the carbide flow which extended over 10 minutes, the vacuum was adjusted to 60 mm. Hg; in the middle period to 100 mm. Hg, and towards the end to 50 mm. Hg. The last carbide outflow was solidified in the nozzle whereupon a vacuum down to 4 mm. Hg could be produced.

The high grade carbide particles were allowed to cool down in the chamber to 400 to 500° C. in vacuo, and then the carbide was taken out. There were obtained 283 kg. of high grade carbide containing 90.5% $CaC_2$, 1% CaO, 0.1% $SiO_2$, 0.6% C, and 0.5% SiC. In the dust separator, there were obtained about 65 kg. of a gray-black powder containing 68% CaO, 26% $CaC_2$, 1% C, and 2% Ca.

I claim:

1. A process for decreasing the oxide content of commercial calcium carbide comprising producing a melt of calcium carbide in an electric furnace, tapping such melt, and subjecting said tapped melt outside said furnace at a temperature of about 1600 to 2000° C. to a vacuum in the range of about 1 to 100 mm. Hg, the higher vacuum corresponding to the lower Hg values in said range being employed at the lower temperatures, thereby reacting calcium oxide present as impurity with calcium carbide to form calcium vapor and carbon monoxide and removing said gases by said vacuum.

2. A process for decreasing the oxide content of commercial calcium carbide comprising producing a melt of calcium carbide in an electric furnace, tapping such melt, and spraying tapped melt immediately with a temperature of about 1600 to 2000° C. into an evacuated zone maintained under a vacuum in the range of 1 to 100 mm. Hg, the higher vacuum corresponding to the lower Hg values in said range being employed at the lower temperatures, thereby reacting calcium oxide present as impurity with calcium carbide to form calcium vapor and carbon monoxide and removing said gases by said vacuum.

References Cited in the file of this patent

UNITED STATES PATENTS 2,886,411     Kaess  ---------------- May 12, 1959

OTHER REFERENCES

Schwarzkopf and Kieffer, "Refractory Hard Metals," page 65 (TN 677 S 36 C.4).